United States Patent
Gupta

(12) 
(10) Patent No.: US 7,110,715 B2
(45) Date of Patent: Sep. 19, 2006

(54) WIRELESS COMMUNICATION NETWORK INCLUDING AN ADAPTIVE WIRELESS COMMUNICATION DEVICE AND A METHOD OF OPERATING THE SAME

(75) Inventor: Piyush Gupta, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 424 days.

(21) Appl. No.: 10/229,972

(22) Filed: Aug. 28, 2002

(65) Prior Publication Data

US 2004/0043782 A1 Mar. 4, 2004

(51) Int. Cl.
H04B 7/15 (2006.01)
H04B 7/185 (2006.01)
H04B 3/36 (2006.01)

(52) U.S. Cl. .......................... 455/11.1; 7/10; 370/316; 375/211

(58) Field of Classification Search ............... 455/11.1, 455/15, 517, 7, 9, 16; 370/321, 316, 226; 375/356, 213, 211

See application file for complete search history.

(56) References Cited

U.S. PATENT DOCUMENTS

| | | | | |
|---|---|---|---|---|
| 3,955,140 | A * | 5/1976 | Stephens et al. | 455/11.1 |
| 5,408,679 | A * | 4/1995 | Masuda | 455/11.1 |
| 5,541,979 | A * | 7/1996 | Leslie et al. | 455/436 |
| 5,790,938 | A * | 8/1998 | Talarmo | 455/11.1 |
| 5,850,593 | A * | 12/1998 | Uratani | 455/11.1 |
| 6,353,729 | B1 * | 3/2002 | Bassirat | 455/11.1 |
| 6,373,833 | B1 * | 4/2002 | Suonvieri et al. | 370/347 |
| 6,456,853 | B1 * | 9/2002 | Arnold | 455/456.1 |
| 6,580,909 | B1 * | 6/2003 | Carro | 455/450 |
| 6,647,244 | B1 * | 11/2003 | Haymond et al. | 455/11.1 |
| 6,671,525 | B1 * | 12/2003 | Allen et al. | 455/574 |
| 6,678,341 | B1 * | 1/2004 | Miyake et al. | 375/356 |
| 6,721,305 | B1 * | 4/2004 | Chan et al. | 370/349 |

* cited by examiner

Primary Examiner—Tilahun Gesesse

(57) ABSTRACT

An adaptive wireless communication device employable in a wireless communication network having a base station and a method of operating the same. In one embodiment, the adaptive wireless communication device includes communication circuitry configured to transmit and receive messages. The adaptive wireless communication device also includes a relay coordinator configured to provide an adaptive relay path in cooperation with the base station for a message associated with a wireless communication device as a function of a characteristic of the message.

21 Claims, 3 Drawing Sheets

WIRELESS COMMUNICATION NETWORK INCLUDING AN ADAPTIVE WIRELESS COMMUNICATION DEVICE AND A METHOD OF OPERATING THE SAME

TECHNICAL FIELD OF THE INVENTION

The present invention is directed, in general, to wireless communication systems and, more specifically, to an adaptive wireless communication device, method of operating the same and a wireless communication network employing the device and method.

BACKGROUND OF THE INVENTION

Wireless communication networks are becoming increasingly important in the voice, video and data communications arenas as demand for "instant availability" and "position transparency" increases. Wireless types of communication networks typically employ one or more base stations that are used to communicate with a collection of wireless communication devices and associated transceivers within a cell of the wireless communication network. Historically, the wireless communication devices have been mobile telephones or paging devices. However, the types of wireless devices are steadily growing as new types of wireless products and services rapidly proliferate.

A prevalent wireless communication network employs a collection of contiguous cells wherein each cell has a base station located therein. The base station communicates directly with each wireless communication device located within its cell to accommodate its messaging. This message may be directed to another wireless communication device located within the same cell. Additionally, the message may be communicated with a wireless communication device located within another cell, or a wireless communication device that is not part of the wireless communication network. In all of these cases, the wireless communication device communicates directly with its base station to accomplish its messaging.

A characteristic such as signal strength (i.e., signal power) associated with a message between a wireless communication device and its base station may typically diminish as an inverse function of an exponential factor (e.g., the square) of the distance between them. As a practical consideration, the transmit power associated with a base station or a transmitter of the wireless communication device is limited by legal or system considerations to a maximum allowable level. Additionally, the signal path between the base station and the wireless communication device is typically not line-of-sight and may be obscured by changes in elevation or other obstacles such as tall buildings. Multiple signal paths, often producing reflections, may also introduce signal fading as these multiple signals recombine in a random manner.

Log-normal shadowing and severe weather conditions, such as storms having lightning, rain or ice, may also diminish the signal strength associated with the message. Therefore, a wireless communication device located near the periphery of a cell may experience signal strength problems that sharply degrade a quality of service associated with message whereas a wireless communication device positioned more closely within the cell to the base station does not experience such a degradation.

Accordingly, what is needed in the art is a way to reduce signal degradation associated with a wireless communication device within a wireless communication network.

SUMMARY OF THE INVENTION

To address the above-discussed deficiencies of the prior art, the present invention provides an adaptive wireless communication device employable in a wireless communication network having a base station. In one embodiment, the adaptive wireless communication device includes communication circuitry configured to transmit and receive messages. The adaptive wireless communication device also includes a relay coordinator configured to provide an adaptive relay path in cooperation with the base station for a message associated with a wireless communication device as a function of a characteristic of the message.

In another aspect, the present invention provides a method of operating an adaptive wireless communication device employable in a wireless communication network having a base station. In one embodiment, the method includes transmitting and receiving messages with communication circuitry. The method also includes providing an adaptive relay path in cooperation with the base station for a message associated with a wireless communication device as a function of a characteristic of the message.

The present invention also provides, in yet another aspect, a wireless communication network including a first cell having a first base station and a second cell having a second base station. The wireless communication network also includes a wireless communication device capable of roaming between the first and second cells. The wireless communication network still further includes an adaptive wireless communication device having communication circuitry configured to transmit and receive messages and a relay coordinator configured to provide an adaptive relay path in cooperation with one of the first and second base stations for a message associated with the wireless communication device as a function of a characteristic of the message.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
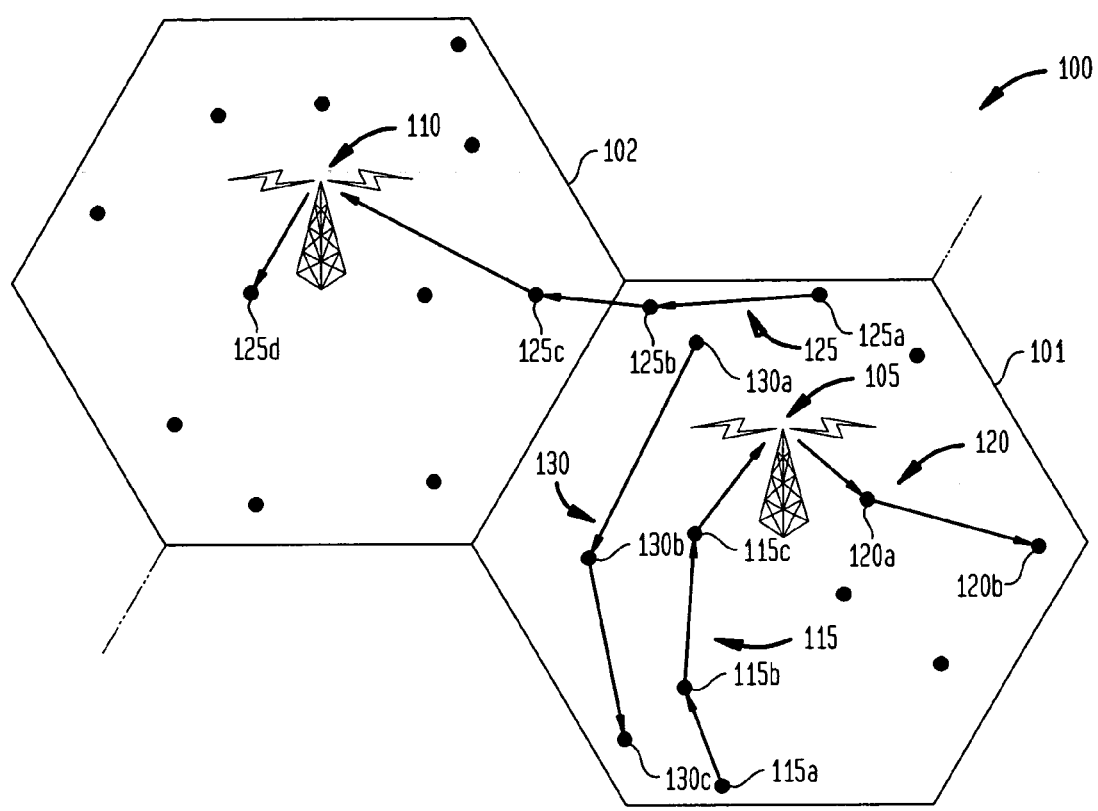
FIG. 1 illustrates a network diagram of an embodiment of a wireless communication network constructed in accordance with the principles of the present invention.

Referring initially to FIG. 1, illustrated is a network diagram of an embodiment of a wireless communication network, generally designated 100, constructed in accordance with the principles of the present invention. The wireless communication network 100 includes a first cell 101 having a first base station 105 and a second cell 102 having a second base station 110. The wireless communication network 100 also includes a plurality of adaptive wireless communication devices 115a, 115b, 115c, 120a, 120b, 125a, 125b, 125c, 125d, 130a, 130b, 130c.

Each of the first, second and third adaptive wireless communication devices 115a, 115b, 115c includes communication circuitry and a relay coordinator. In the illustrated embodiment, the first, second and third adaptive wireless communication devices 115a, 115b, 115c form a first adaptive relay path 115 for a first message between the first adaptive wireless communication device 115a and the first base station 105.

The first message, transmitted from the communication circuitry associated with the first adaptive wireless communication device 115a, is relayed in sequence through the relay coordinators associated with the second and third adaptive wireless communication devices 115b, 115c, respectively, to the first base station 105. The message is then appropriately directed by the first base station 105.

A second adaptive relay path 120 for a second message is illustrated between the first base station 105 and the communication circuitry associated with the fifth adaptive wireless communication device 120b. The second message is relayed from the first base station 105 through the relay coordinator associated with the fourth adaptive wireless communication device 120a to the communication circuitry associated with the fifth adaptive wireless communication device 120b.

Of course, the first message and the second message may be different messages as appropriately directed by the base station 105. Alternatively, the first and second messages may be the same message sent from the first adaptive wireless communication device 115a and received by the fifth adaptive wireless communication device 120b. Generally, each of the communication circuitry (including a transceiver) may either transmit or receive a message, and the message may include voice, video or data information, as appropriate.

For purposes of the present invention, an adaptive relay path is a communication path for a message wherein the message is relayed (i.e., received and then re-transmitted) by at least one adaptive wireless communication device that resides between a source transmitter and a destination receiver. A particular adaptive relay path depends on the availability and proper positioning of such devices. Additionally, a particular adaptive relay path is also typically formed based on a characteristic of a signal (e.g., signal strength) associated with the transmitted or received message. If appropriate relay coordinators are not available or not properly positioned, or the associated signal strength is adequate, a wireless communication device may communicate directly with its base station as currently occurs in wireless communication networks.

The sixth, seventh, eighth and ninth adaptive wireless communication devices 125a, 125b, 125c, 125d form a third adaptive relay path 125 including the second base station 110. A third message traverses the third adaptive relay path 125 between the sixth adaptive wireless communication device 125a, located in the first cell 101, and the ninth adaptive wireless communication device 125d, located in the second cell 102.

Alternatively, the third message may be sent to a destination that is outside the second cell 102 by the second base station 110, if appropriate. Of course, the third message may be responded to by the ninth adaptive wireless communication device 125d with a returned third message to the sixth adaptive wireless communication device 125a along the third adaptive relay path 125 (or to another destination device via another path). Alternatively, the returned third message may employ another adaptive relay path as appropriate to maximize a signal strength associated with the returned third message. In general, an established adaptive relay path may undergo a metamorphose into another adaptive relay path that provides an enhanced signal strength. This may occur as relay coordinators employed in a particular adaptive relay path change position and therefore alter their signal strength characteristics.

The tenth, eleventh and twelfth adaptive wireless communication devices 130a, 130b, 130c illustrate an adaptive peer-to-peer relay path 130 between the tenth and twelfth adaptive wireless communication devices 130a, 130c. This adaptive peer-to-peer relay path 130 occurs in the first cell 101 and does not include the first base station 105 directly within the message path. This illustration demonstrates that the base station 105 may assign one or more of the relay coordinators within the first cell 101 the capability of relaying messages between two or more wireless communication devices within the first cell 101. This condition may prevail, without intervention from the first base station 105, until a change occurs within the first cell 101 (such as one of adaptive wireless communication devices and associated relay coordinator leaving the cell), thereby warranting an adjustment by the first base station 105.

In the illustrated embodiments associated with FIG. 1, each of the adaptive relay paths is bidirectional indicating that all adaptive wireless communication devices may either transmit or receive a message. However, some of the adaptive wireless communication devices may not be called upon to relay messages from a source to a destination device. If so, then those wireless communication devices may include the communications circuitry but not the relay coordinators. Additionally, wireless communication devices that only serve as a source device and may only transmit information or a destination device and may only receive information would employ a unidirectional path.

An enhanced performance and benefit may be achieved by applying the principles of the present invention to a wireless communication network. For a given average throughput to the backbone within a cell, a reduction in both the peak and average power, associated with a base station and the wireless communication devices, may be achieved. For a wireless communication device in a wireless communication network employing adaptive relay paths, peak power may be represented in the form of:

$$Power_{PEAKarp} = \Theta\left(\left(\frac{\log n}{n}\right)^{\frac{\alpha}{2}}\right),$$

where n is the number of adaptive wireless communication devices employed in the wireless communication network, and a is the signal power path loss exponent.

The order form of this equation is accurate in terms of the variables n and α, but the equation does not include constants, which may be specific to a particular embodiment, application or design. Therefore this equation and the following equations employ a standard notation where $g(x)=\Theta(f(x))$ implies that $C_1 f(x) \leq g(x) \leq C_2 f(x)$, for constants $C_1$ and $C_2$ that are not dependent on x and which, again, vary depending on the application or design.

Alternatively, peak power for a wireless communication device in a wireless communication network utilizing only base stations may be represented in the form of:

$$Power_{PEAKbs} = \Theta\left(\frac{1}{b^{\frac{\alpha}{2}}}\right),$$

where b represents the number of base stations and a is the signal power path loss exponent, as before.

The average power for a wireless communication device in a wireless communication network employing adaptive relay paths may be represented in the form of:

$$Power_{AVERAGEarp} = \Theta\left(\frac{1}{\log n}\left(\frac{\log n}{n}\right)^{\frac{\alpha}{2}}\right),$$

and the average power for a wireless communication device in a wireless communication network utilizing only base stations may be represented in the form of:

$$Power_{AVERAGEbs} = \Theta\left(\left(\frac{1}{n/b}\right)\left(\frac{1}{b^{\frac{\alpha}{2}}}\right)\right),$$

where n, b and α are defined as before. The average transmission range associated with these peak and average powers may be represented in the form of:

$$r = \Theta\left(\sqrt{\frac{\log n}{n}}\right)$$

for a wireless communication network employing adaptive relay paths, and $$r = \Theta\left(\frac{1}{\sqrt{b}}\right)$$

for a wireless communication network utilizing only base stations.

An average throughput to the backbone for each adaptive wireless communication device may be represented in the form of:

$$Throughput_{AWCD} = \Theta\left(\frac{W}{n/b}\right),$$

where W is a transfer rate expressed in bits per second. This throughput is the same for a wireless communication network employing only a base station or one employing an adaptive relay path that is not peer-to-peer.

A peer-to-peer throughput may be represented in the form of:

$$Throughput_{PEER-TO-PEER_{awcd}} = \Theta\left(\frac{W}{\sqrt{(n/b)\log n}}\right),$$

for a wireless communication network employing an adaptive peer-to-peer relay path. Alternatively, a wireless communication network employing communication between two peers directly involving a base station may be represented in the form of:

$$Throughput_{PEER-TO-PEER_{bs}} = \Theta\left(\frac{1}{2}\left(\frac{W}{n/b}\right)\right).$$

An improved overall throughput for a wireless communication network is typically afforded by employing both of these modes of operation.

Also, a more uniform quality of service for all wireless communication devices may be achieved. This quality of service is substantially independent of their location with respect to an associated base station. Additionally, a greater overall communication network robustness may be achieved by employing the more distributed nature of messaging within a wireless communication network. This robustness provides an improved protection against individual failures, particularly those associated with individual base stations.

Figure 2:
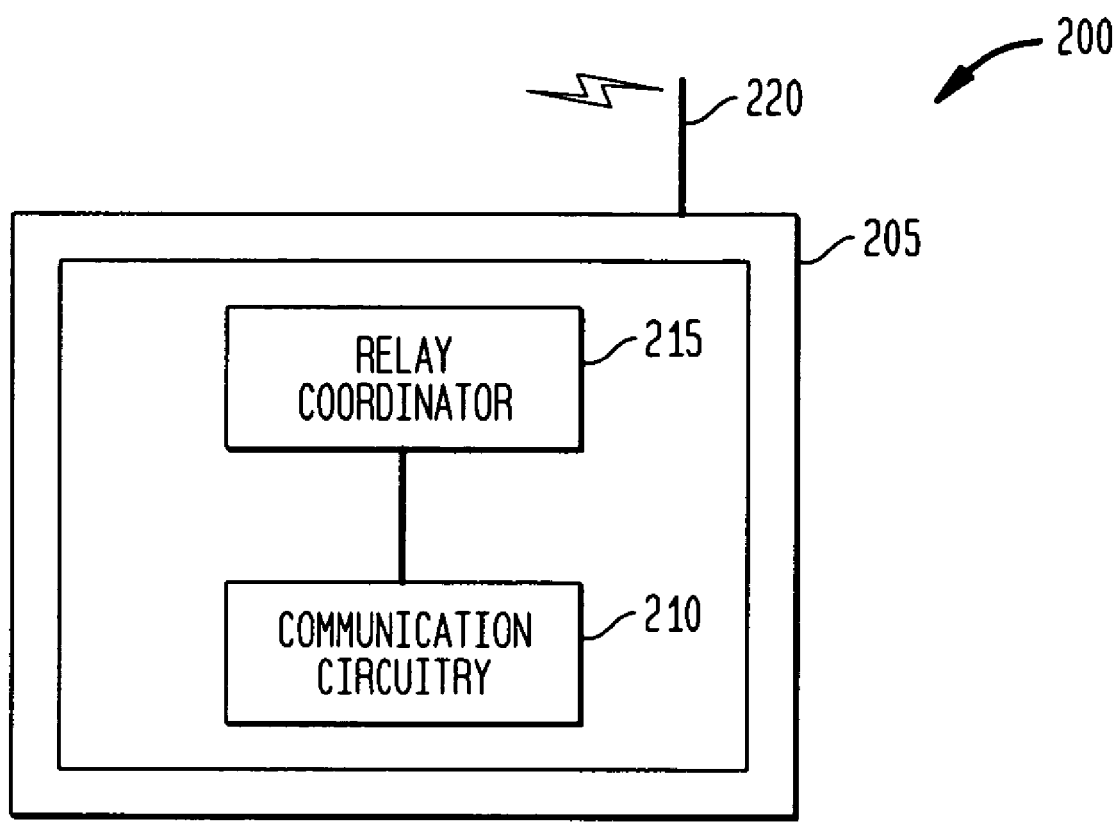
FIG. 2 illustrates a block diagram of an embodiment of an adaptive wireless communication device constructed in accordance with the principles of the present invention.

Turning now to FIG. 2, illustrated is a block diagram of an embodiment of an adaptive wireless communication device, generally designated 200, constructed in accordance with the principles of the present invention. In the illustrated embodiment, the adaptive wireless communication device 200 includes an enclosure 205, communication circuitry 210, a relay coordinator 215 and an antenna 220, which is coupled to the communication circuitry 210 and the relay coordinator 215.

The enclosure 205 contains both the communication circuitry 210 and the relay coordinator 215 in the illustrated embodiment. Alternative embodiments of the present invention may employ a relay coordinator that is separately housed from the communication circuitry. Such an arrangement would allow flexibility in forming an adaptive wireless communication device that allows an existing wireless communication device to be retrofitted and more easily utilized.

The adaptive wireless communication device 200 may be selected from the group consisting of a cellular phone, a pager, a personal digital assistant and a laptop personal computer. Of course, other currently available or future created transportable devices (e.g., portable and hand held devices) may be employed as the adaptive wireless communication device 200. Generally, the communication circuitry 210 may transmit and receive messages that include voice, video and data information. In the illustrated embodiment, the communication circuitry 210 and the relay coordinator 215 employ the antenna 220 jointly to accomplish their separate messaging tasks. In an alternative embodiment of the present invention, the communication circuitry 210 may employ one antenna and the relay coordinator 215 may employ another antenna.

When active, the relay coordinator 215 receives a message associated with another wireless communication device or a base station and re-transmits (i.e., relays) this message along an adaptive relay path toward its intended destination. In an alternative embodiment, the relay coordinator 215 may be configured to relay a plurality of messages associated with a plurality of other wireless communication devices along a plurality of adaptive relay paths to a plurality of destinations. Time division or frequency division multiplexing techniques may be advantageously employed in these cases.

In the illustrated embodiment, the relay coordinator 215 is configured to monitor characteristics (such as a signal strength or a voice transmission delay) associated with messages from other wireless communication devices. If a monitored signal strength is below a level determined by the quality of service requirements, the relay coordinator 215 automatically re-transmits its associated message at an increased power level. This power level may be one of several selectable power levels wherein the one actually selected is dependent on a proximity of the relay coordinator 215 to an associated base station and predetermined by a communication with the base station. In an alternative embodiment, this power level may be determined independently by the relay coordinator 215 using an average or weighted sum of a set of actual signal strengths monitored. If the delay associated with a voice transmission becomes too great, the base station may reduce the voice communication delay by adjusting the adaptive relay path to include fewer relay coordinators. Alternatively, the relay coordinators employed may adjust to another adaptive relay path employing fewer relay coordinators (typically having increased power levels) thereby reducing the delay.

As discussed with respect to FIG. 1, the relay coordinator 215 may be assigned a role of being a surrogate of an associated base station wherein the relay coordinator 215 employs at least a subset of the activities usually reserved only for a base station. In this role of surrogate base station, the relay coordinator 215 may form at least a portion of an adaptive peer-to-peer relay path created directly between two wireless communication devices wherein an associated message does not employ a base station as it traverses between transmitting and receiving devices.

Figure 3:
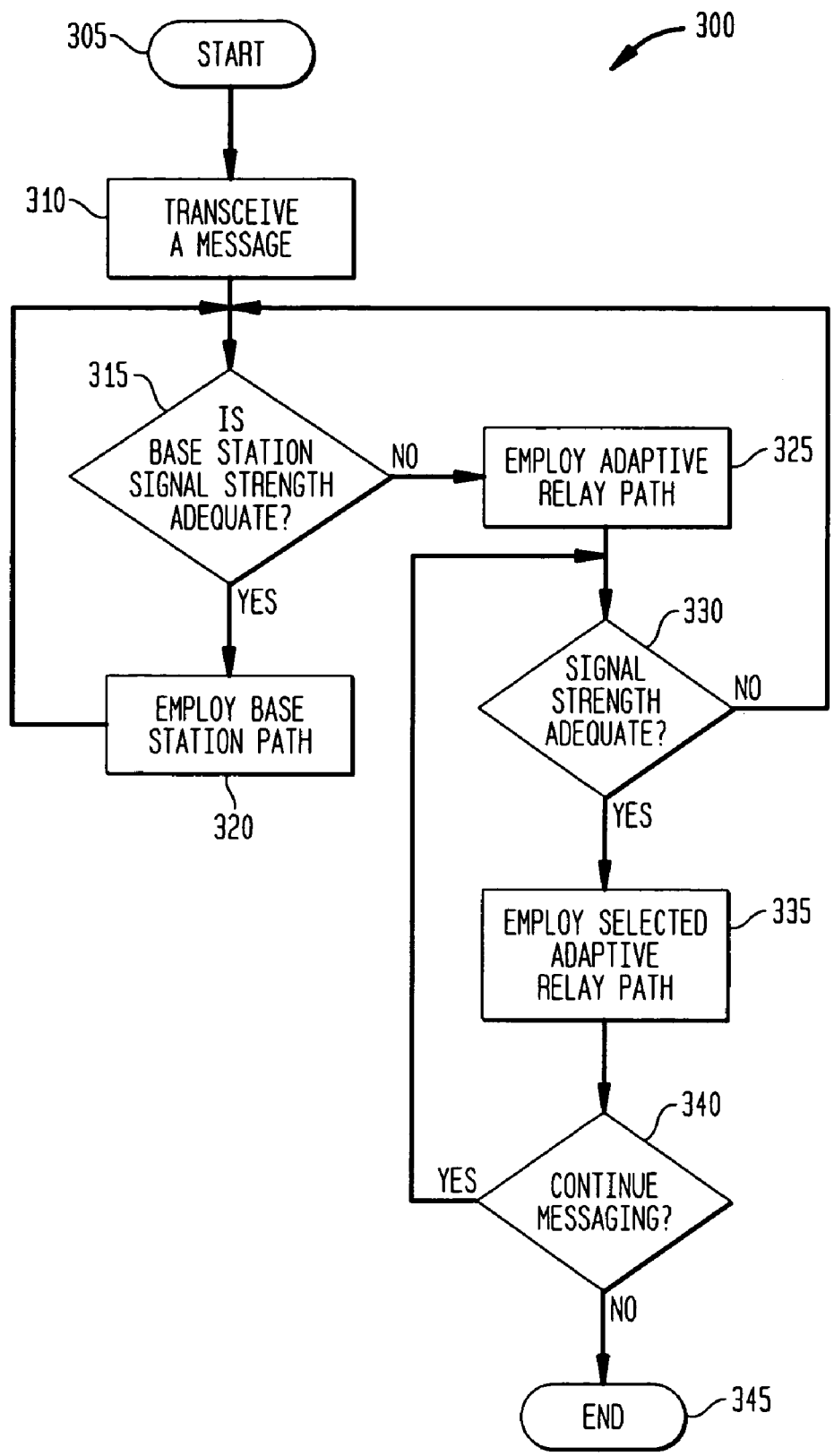
FIG. 3 illustrates a flow diagram of an embodiment of a method of operating an adaptive wireless communication device in accordance with the principles of the present invention.

Turning now to FIG. 3, illustrated is a flow diagram of an embodiment of a method of operating an adaptive wireless communication device, generally designated 300, in accordance with the principles of the present invention. The method 300 may be associated with a wireless communication network having a base station and starts in a step 305 to transceive (transmit or receive) a message associated with the base station using a first wireless communication device in a step 310.

In a first decision step 315, it is determined whether the base station signal strength associated with the message is adequate to assure an acceptable quality of service associated with the wireless communication network. If the signal strength is adequate, a base station path, associated only with the base station, is employed for the message in a step 320. At the conclusion of the step 320, the method 300 returns to the first decision step 315.

If the base station signal strength is not adequate in the first decision step 315, an alternative adaptive relay path is provided for the message between the first wireless communication device and the base station employing a relay coordinator associated with a second adaptive wireless communication device in a step 325. In a second decision step 330, it is determined whether the signal strength of the alternative adaptive relay path provided in the step 325 is adequate. If the signal strength of the alternative adaptive relay path is not adequate, the method 300 returns to the first decision step 315. If the base station signal strength associated with the message is now adequate, the method 300 employs the base station path in the step 320, as before.

If the base station signal strength associated with the message is still not adequate, the method 300 employs another adaptive relay path in the step 325 and determines the adequacy of the message signal strength for this adaptive relay path in the second decision step 330. For a base station signal strength associated with the message that continues to be inadequate, this loop continues until the signal strength of an adaptive relay path associated with the message is adequate. The method 300 then employs the selected adaptive relay path for the message in a step 335.

In a third decision step 340, it is determined whether messaging (transceiving of the message) continues. If messaging continues, the method 300 returns to the second decision step 330 to determine if a current signal strength of the message associated with the selected adaptive relay path is still adequate. If the current signal strength is still adequate, the selected adaptive relay path continues to be employed for the message. If the current signal strength is not adequate, a new path employing the base station or another adaptive relay path will be chosen, as before. If the third decision step 340 determines that messaging is complete, the method 300 ends in a step 345.

In summary, several embodiments of the present invention employing an adaptive wireless communication device and a method of operation thereof have been presented. These embodiments have demonstrated that an enhanced performance and benefit may be achieved. For a given throughput, a reduction in both peak and average power associated with a wireless communication device and a base station may be achieved. This allows for a reduced permanent wireless communication network infrastructure.

A baseline (i.e., backbone) throughput for a wireless communication network is typically constant and determined by the number of base stations employed in the network. However, a peer-to-peer throughput using adaptive peer-to-peer relay paths within a wireless communication network may be shown to increase exponentially with an increase in the employable number of adaptive wireless communication devices within the network. Therefore, an improved overall throughput for the wireless communication network is typically afforded by employing both of these modes of operation.

Additionally, a more uniform quality of service for all wireless communication devices may be achieved substantially independent of their location with respect to an associated base station. This may be accomplished since signal fading and other adverse transmission conditions are typically reduced by a shorter transmission range afforded by an adaptive relay path. Also, greater overall communication network robustness may be achieved providing improved protection against individual failures, particularly those associated with individual base stations.

Although the present invention has been described in detail, those skilled in the art should understand that they can make various changes, substitutions and alterations herein without departing from the spirit and scope of the invention in its broadest form.

What is claimed is:

1. An adaptive wireless communication device employable in a wireless communication network having a base station, comprising:
   communication circuitry configured to transmit and receive messages associated with a wireless communication device; and
   a relay coordinator configured to establish an adaptive relay path for at least one of said messages as a function of a characteristic thereof, said adaptive relay path established as a function of a capability assigned from said base station and as an adaptive peer-to-peer relay path between said adaptive wireless communication device and another wireless communication device, whereas said one of said messages traverses said adaptive relay path without employing said base station.

2. The adaptive wireless communication device as recited in claim 1 wherein said adaptive relay path is adjustable.

3. The adaptive wireless communication device as recited in claim 1 wherein said wireless communication device is located in a first cell of said wireless communication network and said base station is located in a second cell of said wireless communication network.

4. The adaptive wireless communication device as recited in claim 1 wherein said characteristic is a voice transmission delay of said at least one of said messages.

5. The adaptive wireless communication device as recited in claim 1 wherein said characteristic is a signal strength of said at least one of said messages.

6. The adaptive wireless communication device as recited in claim 1 wherein said adaptive relay path is adjusted by altering a number of relay coordinators in said path.

7. The adaptive wireless communication device as recited in claim 1 wherein said adaptive wireless communication device is configured to employ multiple relay coordinators to provide said adaptive relay path.

8. A method of operating a adaptive wireless communication device employable in a wireless communication network having a base station, comprising:
   transmitting ad receiving messages associated with a wireless communication device with communication circuitry;
   establishing an adaptive relay pat as an adaptive peer-to-peer relay pat between said adaptive wireless communication device and another wireless communication device, said establishing based on receiving a capability to establish said adaptive relay path from said base station; and
   providing said adaptive relay path for at least one of said messages as a function of a characteristic thereof whereas said one of said messages traverses said adaptive relay path without employing said base station.

9. The method as recited in claim 8 wherein said adaptive wireless communication device is a mobile device within said wireless communication network.

10. The method as recited in claim 8 wherein said wireless communication device is located in a first cell of said wireless communication network and said base station is located in a second cell of said wireless communication network.

11. The method as recited in claim 8 further comprising adjusting said adaptive relay path by altering number of relay coordinators in said path.

12. The method as recited in claim 8 wherein said characteristic is a signal strength of said message.

13. The method as recited in claim 8 wherein said characteristic is a voice transmission delay of said at least one of said messages.

14. The method as recited in claim 8 wherein said providing employs multiple adaptive wireless communication devices to provide said adaptive relay path.

15. A wireless communication network, comprising:
   a first cell having a first base station;
   a second cell having a second base station;
   a wireless communication device capable of roaming between said first and second cells; and
   an adaptive wireless communication device, including:
      communication circuitry configured to transmit and receive messages associated with said wireless communication device; and
      a relay coordinator configured to establish an adaptive relay path for at least one of said messages as a function of a characteristic thereof, said adaptive relay path established as a function of a capability assigned from one of said base stations and as an adaptive peer-to-peer relay path between said adaptive wireless communication device and said wireless communication device, whereas said one of said messages traverses said adaptive relay path without employing said base stations.

16. The wireless communication network as recited in claim 15 wherein said adaptive relay path is bidirectional.

17. The wireless communication network as recited in claim 15 wherein said wireless communication device is located in said first cell and said relay coordinator is configured to provide said adaptive relay pat in cooperation with said second base station.

18. The wireless communication network as recited in claim 15 wherein said characteristic is a voice transmission delay of said at least one of said messages.

19. The wireless communication network as recited in claim 15 wherein said characteristic is a signal strength of said at least one of said messages.

20. The wireless communication network as recited in claim 15 wherein said base station adjusts said adaptive replay path by reducing a number of relay coordinators in said path.

21. The wireless communication network as recited in claim 15 wherein said adaptive wireless communication device is configured to employ multiple relay coordinators to provide said adaptive relay path.

* * * * *